(12) United States Patent
Rosseel et al.

(10) Patent No.: US 10,375,893 B2
(45) Date of Patent: Aug. 13, 2019

(54) BALE WRAPPING MECHANISM (71) Applicant: CNH Industrial America LLC, New Holland, PA (US)

(72) Inventors: Bram Rosseel, Snellegem (BE); Eddy Lammerant, Oostduinkerke (BE); Kurt Zwaenepoel, De Haan (BE); Johan A. E. Vande Ryse, Bruges (BE)

(73) Assignee: CNH Industrial America LLC, New Holland, PA (US)

( * ) Notice: Subject to any disclaimer, the term of this patent is extended or adjusted under 35 U.S.C. 154(b) by 573 days.

(21) Appl. No.: 14/894,122

(22) PCT Filed: May 26, 2014

(86) PCT No.: PCT/EP2014/060856
§ 371 (c)(1),
(2) Date: Nov. 25, 2015

(87) PCT Pub. No.: WO2014/191366
PCT Pub. Date: Dec. 4, 2014

(65) Prior Publication Data
US 2016/0113204 A1   Apr. 28, 2016

(30) Foreign Application Priority Data

May 27, 2013   (BE) .................................. 2013/0367

(51) Int. Cl.
*A01F 15/07* (2006.01)
*B65B 11/04* (2006.01)
(Continued)

(52) U.S. Cl.
CPC ........... *A01F 15/0715* (2013.01); *A01F 15/07* (2013.01); *B65B 11/04* (2013.01); *B65B 41/12* (2013.01); *B65B 45/00* (2013.01)

(58) Field of Classification Search
CPC .... A01F 15/07; A01F 15/071; A01F 15/0715; B65B 63/04; B65B 41/12; B65B 11/04
(Continued)

(56) References Cited

U.S. PATENT DOCUMENTS 5,450,704 A * 9/1995 Clostermeyer ......... A01F 15/07
100/5
5,557,906 A   9/1996 Viaud
(Continued)

FOREIGN PATENT DOCUMENTS

EP    809930 A1   12/1997
EP    2014150 A1   1/2009

*Primary Examiner* — Andrew M Tecco
*Assistant Examiner* — Nicholas E Igbokwe
(74) *Attorney, Agent, or Firm* — Patrick M. Sheldrake; Peter K. Zacharias (57) ABSTRACT A bale wrapping mechanism has a roll holding station and a duckbill provided for clamping one end of the roll of wrapping material, said duckbill being pivotally mounted, via at least a first hinge, to the baling chamber sidewalls, for delivering said wrapping material to said baling chamber by insertion of said duckbill between adjacent rolls of said baling chamber, wherein the wrapping mechanism further has at least a first guiding roll for guiding the wrapping material between said roll holding station and said duckbill, wherein said first guiding roll axis substantially coincides with the first hinge axis.

10 Claims, 4 Drawing Sheets (51) Int. Cl.
*B65B 41/12* (2006.01)
*B65B 45/00* (2006.01)

(58) Field of Classification Search
USPC .... 53/116, 118, 582, 587, 389.1; 100/88, 89
See application file for complete search history.

(56) References Cited

U.S. PATENT DOCUMENTS

| | | | |
|---|---|---|---|
| 5,855,109 A * | 1/1999 | Vande Ryse | A01D 89/004 |
| | | | 100/88 |
| 6,021,622 A * | 2/2000 | Underhill | A01F 15/0715 |
| | | | 53/118 |
| 6,029,420 A | 2/2000 | Tertilt et al. | |
| 6,446,548 B2 * | 9/2002 | Chow | A01F 15/141 |
| | | | 100/13 |
| 7,181,900 B2 | 2/2007 | Hood et al. | |
| 7,513,088 B2 | 4/2009 | Vande Ryse | |
| 8,973,339 B2 | 3/2015 | Vandamme | |
| 2007/0157556 A1 * | 7/2007 | Feraboli | A01F 15/0715 |
| | | | 53/399 |
| 2010/0162676 A1 * | 7/2010 | Simmons | A01F 15/0715 |
| | | | 56/341 |
| 2011/0179750 A1 * | 7/2011 | Smith | A01F 15/0715 |
| | | | 53/399 |

\* cited by examiner

FIG. 1

PRIOR ART

FIG. 2

PRIOR ART

BALE WRAPPING MECHANISM

This application is the US National Stage filing of International Application Serial No. PCT/EP2014/060856 filed on May 26, 2014 which claims priority to Belgian Application BE2013/0367 filed May 27, 2013, each of which is incorporated herein by reference in its entirety.

FIELD OF THE INVENTION

The present invention relates to an agricultural round baler. More specifically it relates to an improvement to the wrap dispensing system that allows a net wrap to be placed around a formed bale.

BACKGROUND OF THE INVENTION

Agricultural round balers have been used for several decades to collect and bind crop material so as to facilitate the storage of crop material for later use. Generally, a mower or mower-conditioner cuts the crop and arranges it in a windrow for drying. Later, an agricultural tractor pulls a baler over the windrow to collect the crop material. The baler's windrow pickup gathers the cut and windrowed crop and lifts it into the baling chamber. The baling chamber consists of a pair of opposing sidewalls with a series of belts that rotate and compress the crop material into a cylindrically shaped bale. When the bale has achieved a desired size and density, the operator wraps the bale to ensure that the cylindrical and compact nature of the bale is maintained. There are many wrapping materials and methods of wrapping the bale depending on a variety of factors. Initially, twine was used to wrap the bale. Later net-wrap and silage sheets were introduced. After the bale is bound or wrapped, it is ejected from the baler for later pickup by the farmer.

As previously mentioned, there are a variety of agricultural round balers. A general example of this device is illustrated by the New Holland Roll-Belt™ Round Baler model number 678 manufactured by New Holland North America, Inc. Generally, round balers are pulled by an agricultural tractor and receive rotational power from the tractor's power-take-off shaft positioned at the rear of the tractor. The energy is transmitted to a gearbox positioned on the baler. Some balers also use a hydraulic motor and pump arrangement to provide energy to the various baler elements such as the various rollers and belts. As previously discussed, a variety of methods are used to wrap the bale. Relatively recently, the use of netting or net-wrap has been introduced. It is desirable for bales to maintain a cylindrical shape, however this has been especially difficult near the edge of the cylindrical bale. It is difficult for twine to remain on the edge of the bale as well as mechanically placing the twine in that position. Recently attempts have been made to extend a portion of the net-wrap around the edge of the round bale. By allowing a slight portion of the net-wrap to extend over the edge of the bale, the appearance of the round bale is improved. Furthermore, the bale is afforded additional protection.

The tension that is applied to the net is determining for a fast and optimal spreading of the net-wrap over the edges of the bale. A tension that is too small will typically result in the net not spreading out, but remaining bundled in the centre of the bale. As a result, when it takes a long time to achieve the optimal tension, a significant amount of net is wrapped in a bundle around the centre of the bale thereby inefficiently using the net material. When the tension is too high, the net will apply to much tension on the supply system and will prevent movement of the supply system towards the baling chamber. That way, no supply of net will be possible and the feeding of net towards the formed bale will not occur.

SUMMARY OF THE INVENTION

It is an object of the present invention to provide a mechanism for wrapping material around a round bale, wherein the tension of the material is controllable in a better way than in prior art mechanisms.

To this end, the invention provides an agricultural round baler comprising a main frame, a baling chamber supported by said main frame, said baling chamber having a pair of opposing sidewalls, and a pair of stationary, adjacent rolls which are rotationally affixed to said sidewalls; the baler further comprising means for feeding crop material into said baling chamber for forming therein a cylindrical bale having a cylindrical portion and a pair of opposing ends; and comprising a bale wrapping mechanism comprising a roll holding station provided for holding a roll of wrapping material, the mechanism further comprising a duckbill provided for clamping one end of the roll of wrapping material, said duckbill being pivotally mounted, via at least a first hinge, to the baling chamber sidewalls, for delivering said wrapping material to said baling chamber by insertion of said duckbill between said adjacent rolls of said baling chamber, wherein the wrapping mechanism further comprises at least a first guiding roll for guiding the wrapping material between said roll holding station and said duckbill, characterized in that said first guiding roll axis substantially coincides with the first hinge axis in such a manner that pivoting said duckbill has no significant influence in the wrapping material distance between the duckbill and the roll holding station.

By aligning the rotation point of the duckbill (the first hinge axis) with a guiding roll, pivoting the duckbill around the rotation point does not influence the tension on the wrapping material. When the duckbill is pivoted, because the wrapping material is guided over the guiding roll that coincides with the hinge point, the length of wrapping material between roll holding station and duckbill remains constant, although the distance between the duckbill and the roll holding station might change. As a result, pivoting the duckbill does not result in the duckbill pulling wrapping material out of the roll holding station or pushing back wrapping material to the roll holding station. Since no pulling or pushing back of wrapping material occurs when pivoting the duckbill, the tension is not significantly influenced by the pivoting of the duckbill, contrary to prior art systems. This allows the tension to be controlled more easily.

Preferably, said first hinge connects said baling chamber sidewalls with an intermediary arm that is connected to said duckbill so that said duckbill is pivotally mounted to the baling chamber sidewalls via said intermediary arm. The duckbill movement is preferably controlled via an intermediary arm. By designing the intermediary arm in length and form, the movement of the duckbill can be amended and thereby optimized to deliver the wrapping material between the adjacent rolls of the baling chamber.

Preferably, the duckbill is pivotally connected to said intermediary arm via a second hinge, whereby the wrapping mechanism comprises a second guiding roll, whereby said second guiding roll axis substantially coincides with the second hinge axis. By providing a second hinge, a second degree of freedom is given to the duckbill, to allow a more complex movement thereof. Providing the second guiding roll, and guiding the wrapping material over the first and the second guiding roll, has as a result that rotating around the second hinge also does not significantly affect the tension on the wrapping material.

Preferably, a second intermediary arm is pivotally mounted to said duckbill via a third hinge that is positioned at a distance from said second hinge, which second intermediary arm is further pivotally mounted to said baling chamber sidewalls via a fourth hinge so that movement of the duckbill is determined by the first and second intermediary arm. Via the second intermediary arm, the duckbill can be guided in a predetermined movement, as will be explained with reference to the figures. The combination of first and second intermediary arm allows designing the wrapping mechanism such that the duckbill follows a complex movement for delivering the wrapping material between the adjacent rolls.

Preferably, said duckbill comprises a pair of elongate plates that are biased towards on another to grip said wrapping material therebetween, the plates thereby forming a duckbill body showing a sharp edge at one end thereof. Via the sharp edge, the wrapping material can be gripped. Furthermore, the sharp edge can be moved in between the adjacent rolls to deliver the wrapping material into the baling chamber.

Preferably, said intermediary arm is connected to said duckbill at an edge opposite to said sharp edge, while said second intermediary arm is connected to the duckbill at a central zone thereof. Such configuration proves to result in an efficient design for introducing wrapping material in between the adjacent rolls of the baling chamber sidewalls. Furthermore, movement of the duckbill proves to be optimal.

Preferably, the duckbill is movable between an advanced position and a retracted position, whereby the duckbill sharp edge extends between the adjacent rolls to deliver the wrapping material into the baling chamber in the advanced position. Movement between two extreme positions (advanced and retracted) can be easily controlled. Furthermore the movement can be designed for an optimal delivery in the advanced position and for an intelligent place-occupation in the retracted position.

Preferably, the duckbill, in the retracted position, is self-supporting in such a manner that the duckbill remains in the retracted position without external forces being applied. When the duckbill is self-supporting in the retracted position, a power failure in the baler will not lead to movement of the duckbill out of the retracted position. In the retracted position, the duckbill does not interfere with the bale in the baling chamber (in the advanced position, the duckbill is intended to interfere by delivering the wrapping material to the baling chamber to cover the bale). Therefore it is advantageous when the duckbill is self-supporting in the retracted position.

Preferably, the guiding rolls extend substantially parallel to the roll of wrapping material. This allows an easy guidance of the wrapping material over the guiding rolls to the duckbill.

BRIEF DESCRIPTION OF THE DRAWINGS

The invention will now be described in more details with respect to the drawings illustrating some preferred embodiments of the invention. In the drawings.

In the drawings a same reference number has been allocated to a same or analogous element.

DETAILED DESCRIPTION OF PREFERRED EMBODIMENTS

Referring to the drawings, it is possible to observe the major elements and general operation of the present invention. Left and right references are used as a matter of convenience and are determined by standing at the rear of the round baler and facing the forward end in the normal direction of travel. Likewise, forward and rearward are determined by normal direction of travel of the tractor or round baler. Upward or downward orientations are relative to the ground or operating surface. Horizontal or vertical planes are also relative to ground.

Figure 1:
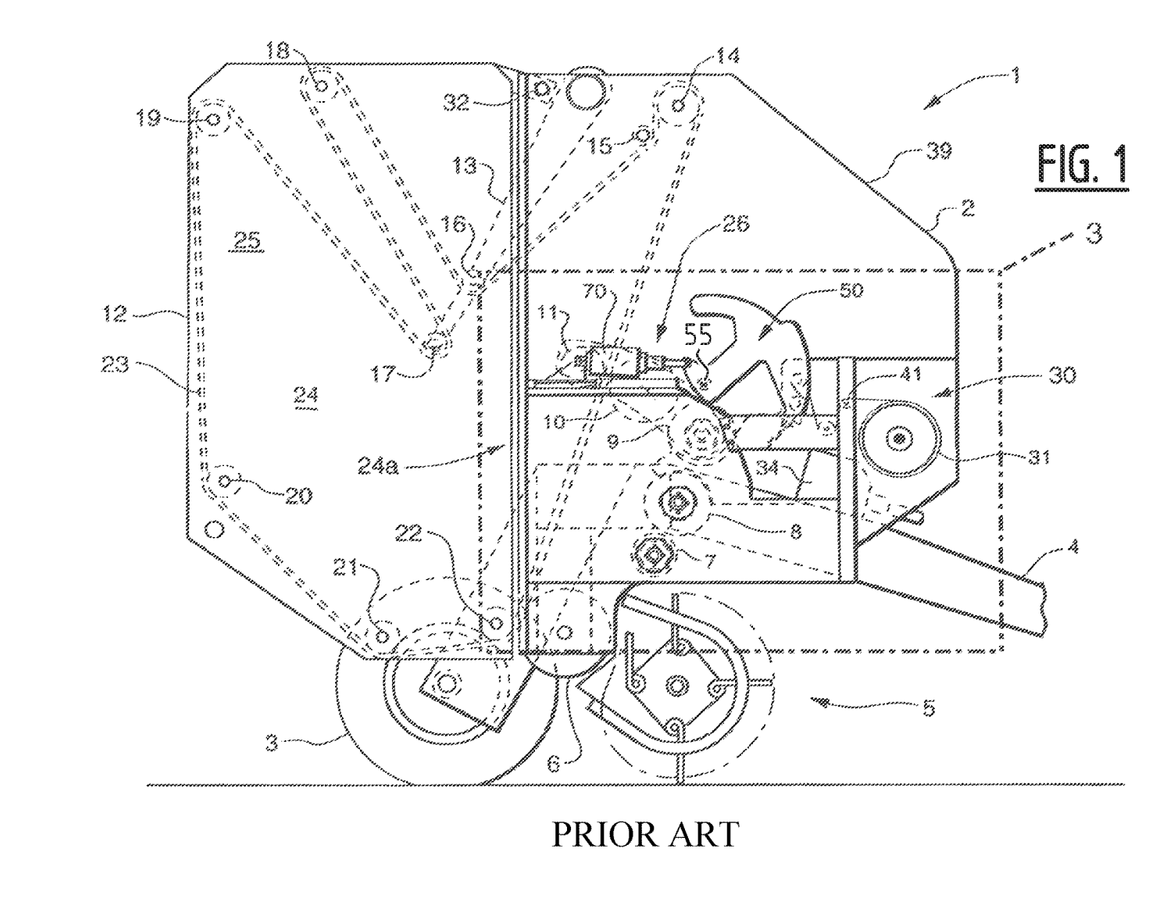
FIG. 1 shows a cross-section of a round agricultural baler with parts in position to begin picking up crop material to form a cylindrical bale.

FIG. 1 illustrates a conventional round baler 1 with the baling chamber 24a ready to receive crop material. The round baler 1 is attached to a tractor (not shown) by means of a tongue 4. Rotational power from the tractor's power-take-off shaft (not shown) is transmitted to a gearbox 34 via a drive shaft. This is the source of power to operate the round baler. It is also possible that a hydraulic motor and pump arrangement may be used.

The round baler 1 has a main frame 2 supported by a pair of wheels (only one shown) 3. A pickup 5 is positioned in front of the wheels 3. The baling chamber 24a is defined by a pair of opposing baling chamber sidewalls 24 and a series of rubber belts defining an apron 23. Further defining the bale chamber 24a is the floor roll 6, starter roll 7 and stationary dimple roll 8 and a sledge assembly 26. The baling chamber 24a has tailgate 12 that pivots about the tailgate pivot 32 to separate the tailgate 12 from the front portion 39 of the baler 1. The sledge assembly 26 comprises a pair of sledge arms 33 between which rotatably extend a lower, pivot roll 9, a middle, stripper roll 10 and an upper, follower roll 11. The assembly is rotatable about an axis which coincides with the axis of the pivot roll 9.

The series of rubber belts or apron 23 encircle the sledge follower roll 11, drive roll 14, backwrap roll 15, front serpentine roll 16, rear serpentine roll 17, top/front tailgate idler roll 18, top/rear tailgate idler roll 19, middle tailgate idler roll 20, bottom tailgate idler roll 21 and nose idler roll 22. The length of the apron 23 is adjusted by a pivoting serpentine take up arm 13. The serpentine take up arm 13 rotates clock wise (as seen in FIG. 1 when the chamber 24a is empty and then in FIG. 2 when the chamber 24a is full) as the crop material enters the bale chamber 23 and increases the length of the apron 23 as the size of the bale 35 increases.

Generally, the tractor pulls the baler 1 over the a windrow of previously cut crop. The pickup 5 inserts the crop between the floor roll 6 and starter roll 7 into the baling chamber 24a. As more crop material enters the bale chamber 24a, the serpentine take up arm 14 and sledge assembly 26 rotate clockwise (as viewed in FIGS. 1 and 2) to allow additional crop material to enter the chamber 24a while ensuring that proper pressure is maintained on the bale. When the bale chamber 24a is full, the bale wrapping system 30 engages and wraps the bale. Once the bale 35 is wrapped, the tailgate 12 raises and ejects the bale from the bale chamber 24a and away from the round baler 1 and tractor.

The bale wrapping mechanism 30 comprises a system for applying wrapping material such as netwrap 41 around a bale by means of a netwrap delivery assembly 50. The netwrap delivery assembly 50 places the netwrap 41 onto the cylindrical portion 36 of the bale 35 and preferably over the edge of the bale so as to cover a portion of each end of the bale. The netwrap 41 is stored on a netwrap roll 31 in a roll holding station and is dispensed to a netwrap delivery assembly 50. FIG. 1 shows a prior art assembly 50 that is rotated about a pivot 55 and controlled by an actuator 70. The netwrap delivery assembly 50 comprises a duckbill showing a sharp edge, that is provided to clamp the wrapping material for introduction in the baling chamber.

Figure 2:
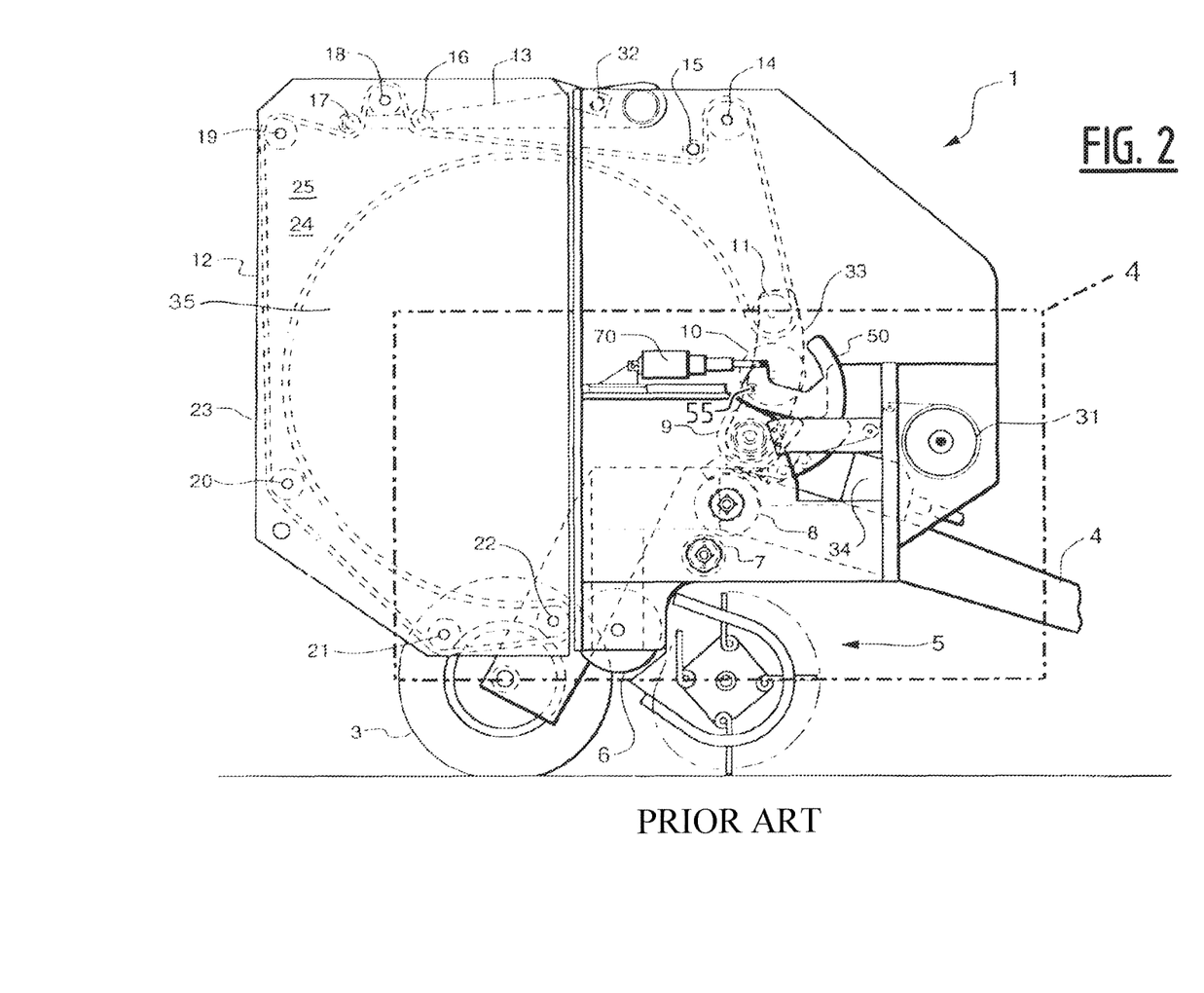
FIG. 2 shows a cross-section similar to FIG. 1, but with parts shown in position to begin wrapping net material around a completed cylindrical bale.
Figure 3:
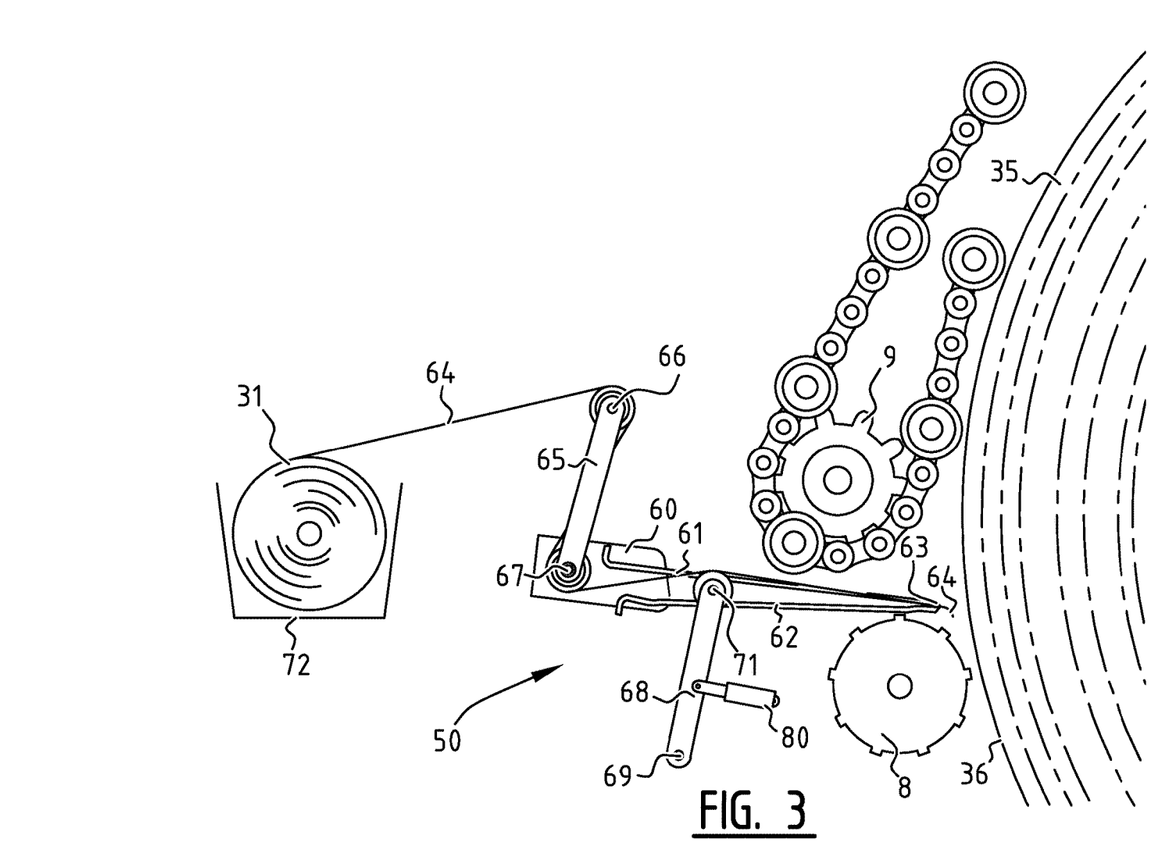
FIG. 3 shows an embodiment of a bale wrapping mechanism in an advanced position.
Figure 4:
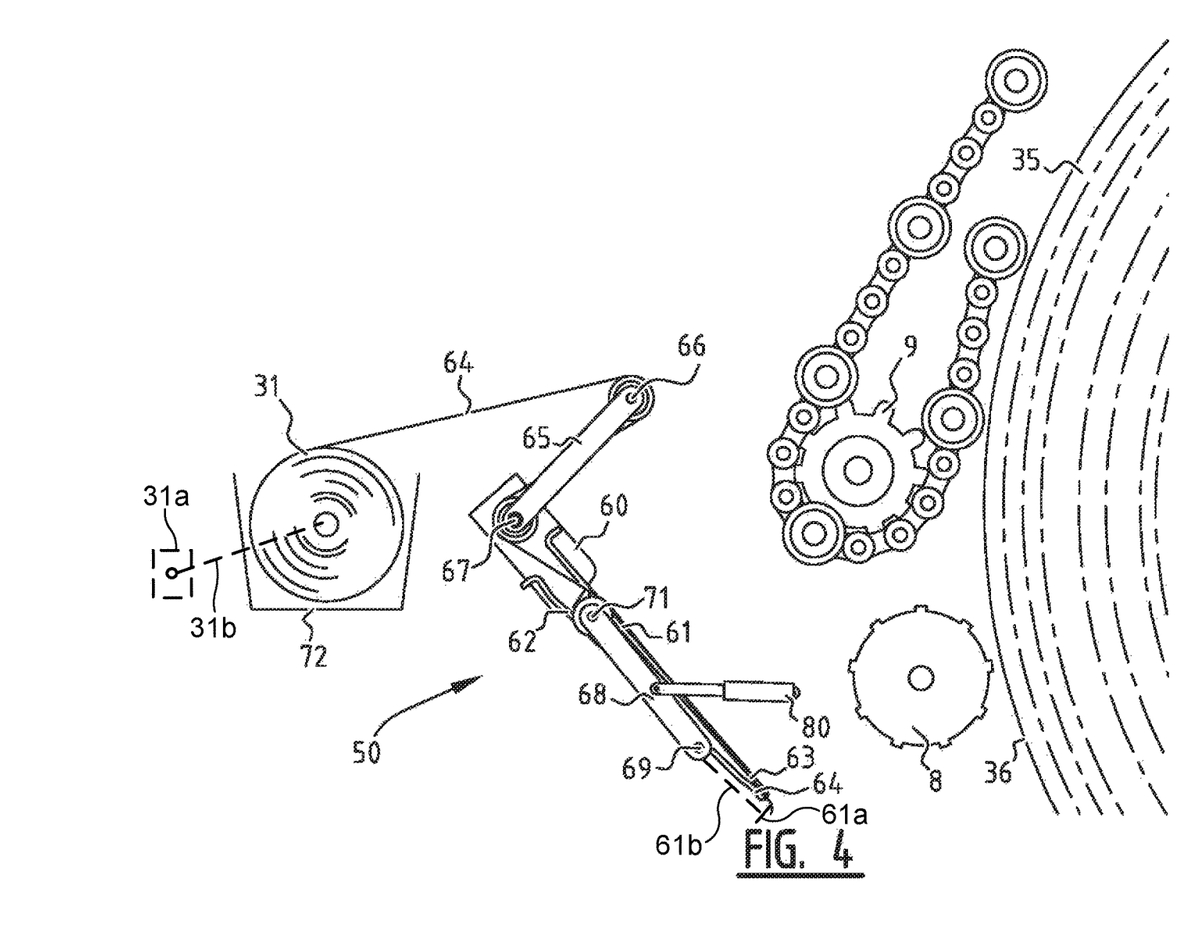
FIG. 4 shows the bale wrapping mechanism of FIG. 3 in a retracted position.

In the start of a typical baling operation, as seen in FIGS. 1 and 4, the netwrap delivery assembly 50 is withdrawn and held in its retracted position. When sufficient crop material has entered the baling chamber 24a (as seen in FIG. 2), the actuator 70 is extended, rotating the netwrap delivery assembly 50 so that the duckbill is inserted between the stationary dimple roll 8 and the pivot roll 9. This may be seen in FIGS. 2 and 3.

Netwrap 41 is provided by the netwrap roll 31. Preferably, the netwrap 41 is spread by spreader rolls and is clamped by the duckbill.

The bale wrapping mechanism 50 (as seen in FIG. 3) comprises a pair of first intermediary arms 65 that can be formed as end plates arranged on opposite sides of the baler and extending substantially parallel to the baling chamber sidewall. The bale wrapping mechanism 50 further comprises a duckbill assembly which extends across the width of the baler between the pair of first intermediary arms 65. In the duck bill assembly, the wrapping material 64 is gripped between an upper plate 61 that is fixed to the first intermediary arms 65 and a pivoted lower plate 62 that is spring biased towards the fixed plate 61. This configuration is also called a duckbill 60. The wrapping material 64 passes between the fixed plate 61 and the pivoted plate 62 and is gripped by them. Because the duckbill acts as a one-way clutch, the wrapping material can pass freely through the duckbill 60 when moving towards the baling chamber but meets with resistance in the opposite direction.

Each first intermediary arm 65 is mounted to the baling chamber sidewall via an first hinge and can be connected to a hydraulic actuator (not shown) which acts to pivot the duckbill between the two end positions show in FIGS. 3 and 4. The figures show an alternative and preferred embodiment wherein the second intermediary arm 68 is connected to a hydraulic actuator 80. The construction as is shown in FIGS. 3 and 4 is such that actuating the first intermediate arm 65 via a hydraulic cylinder might not be able to start rotation of the second intermediary arm 65 in the correct rotational direction. Therefore in the alternative embodiment, the second intermediary arm 65 is actuated. The wrapping material is preferably guided over a metering roller (not shown). Alternatively, one of the first or second guiding roll (explained further hereunder) can be configured as metering roller. Each of the guiding rolls may be formed near its two axial ends with oppositely handed helical formations which act as spreaders to keep the wrapping material taut across the width of the duckbill 60.

The bale wrapping mechanism preferably comprises a cutting mechanism for severing the wrapping material 64 after a bale has been formed. The cutting mechanism comprises a knife 61a, shown in FIG. 4 only but would be included in FIG. 3 also, carried by two arms pivoted about an axis and operated by means of two linking rods which connect the arms to the duckbill through an arrangement schematically illustrated by dashed lines 61b. In this way, as the duckbill is retracted, this being the position adopted by the duckbill in between operating cycles of the wrapping mechanism, the knife is raised against a fixed striker plate or shear bar to separate the length of material wrapped around the newly formed bale from the supply roll.

The bale wrapping mechanism preferably comprises primary and secondary brake mechanisms shown schematically at 31a and connected to supply roll 31 by a mechanical connection 31b, shown as dashed lines associated with the supply roll 31. The primary brake mechanism comprises a brake pad, a lever and a spring and applies a braking force while material is being drawn from the supply roll in order to maintain the material under tension. The secondary brake mechanism, which varies the braking as the size of the supply roll changes comprises a roll size gauge levers, springs and a lever. A braking force is applied to prevent any movement of the supply roll between wrapping cycles and a brake release lever disengages this braking force whenever the duckbill is not in the advanced position. The supply roll is braked between bale wrapping cycle but allows wrapping material to be drawn from the roll while it is maintained under tension during the wrapping cycle.

At the end of a wrapping cycle and at the commencement of the next, the duckbill 60 is in the retracted position, in which the knife has been operated to sever the wrapping material a short distance in front of the duckbill to leave a loose flat of wrapping material 64 protruding from the duckbill 60.

To commence a new wrapping cycle after the next bale has been formed, the hydraulic actuator is operated to rotate the intermediary arms 65, 68 into the advanced position (shown in FIG. 3). This advances the duckbill 60 into the gap between the rollers 8 and 9. The protruding flap of wrapping material 64 is stripped off the duck bill by the stripper roller 8 and introduced into the bale forming chamber. The flap is then gripped by the bale 35 and carried round the periphery of the bale forming chamber. At some stage after it has been sensed that the wrapping material is being drawn from the supply roll 31, the duck bill is returned by the intermediary arms 65, 68 to the retracted position (shown in FIG. 4). Once the metering roller (not shown) has sensed that the sufficient material has been dispensed to wrap the bale fully, the material is severed between the knife and the shear bar, leaving a flap of material 64 protruding from the duckbill 60 in readiness for the following cycle.

The above brief description is believed to suffice for an understanding of working cycle of the baler, but it should be added that, as so far described, the baler and the wrapping mechanism operate in a manner generally analogous to that well documented in the prior art referred to above and further reference may be made to earlier publications for a more detailed description.

FIGS. 1 and 2 are merely added to this application to explain the context of a round agricultural baler. In FIGS. 1 and 2, a bale wrapping mechanism according to the prior art is shown. FIGS. 3 and 4 show a bale wrapping mechanism according an embodiment of the invention. FIG. 3 shows the bale wrapping mechanism in the advanced position where FIG. 4 shows the bale wrapping mechanism in a retracted position.

FIGS. 3 and 4 show a roll holding station 72 (schematically shown) provided for holding a roll of wrapping material 31. This roll of wrapping material 31 supplies wrapping material 64, such as net wrap, to the baling chamber to cover the bale 35. The wrapping material 64 is introduced into the baling chamber via an opening that lies between two adjacent rolls 8, 9. The duckbill 60 is formed to penetrate the opening thereby bringing the wrapping material 64 in the baling chamber. The duckbill 60, as is explained above, is formed by an upper plate 61 and a lower plate 62 that are bias toward another to grip the wrapping material there between. The duckbill 60 thereby forms a sharp edge at one end thereof (in FIG. 3 the sharp end is at the right hand side of the duckbill 60).

According to the embodiment as is shown in FIG. 3 and FIG. 4, the duckbill 60 is pivotally mounted to the baling chamber sidewalls via first intermediate arm 65 and second intermediate arm 68. As is explained above, each intermediate arm can be formed as a pair thereby holding the duckbill at the two opposite sidewalls of the baling chamber. The first intermediate arm 65 extends between a first hinge 66 and a second hinge 67. The first hinge 66 is connected to the baling chamber side wall while the second hinge 67 is connected to the duckbill. Preferably, the second hinge 67 is connected to the duckbill at an edge thereof that is opposite to the sharp edge. The second intermediate arm 68 extends between a third hinge 71 and a fourth hinge 69. Thereby the third hinge connects the second intermediary arm to the duckbill 60 and is positioned at a distance from the second hinge 67. Preferably the third hinge 71 is located in a central zone of the duckbill 60 (central when the duckbill is considered in cross section as shown in the FIGS. 3 and 4). The fourth hinge 69 connects the second intermediary arm to the baling chamber side walls.

The bale wrapping mechanism further comprises guiding rolls for the wrapping material 64. In the embodiment of FIGS. 3 and 4, three guiding rolls are provided which coincide with the first hinge 66, the second hinge 67 and the third hinge 71. As a result of this positioning of the guiding rolls, movement of the duckbill 60 to and from the advanced position does not result in a pushing or pulling of wrapping material 64 from the roll 31. This is the result of the distance between the roll holding station 72 and the first hinge 66 being constant (since the first hinge 66 is connected to the baling chamber side wall), and the distance between the first hinge 66 and the second hinge 67 being constant (since the first intermediate arm does not change length), and the distance between the second hinge 67 and the third hinge 71 (and also the sharp edge of the duckbill 63) being constant. The wrapping material 64 is guided from the roll holding station 72 to the sharp edge 63 of the duckbill 60 over these guiding rolls 66, 67 and 71. Thereby, movement of the duckbill does not influence the length of wrapping material between the roll holding station 72 and the sharp edge 63 of the duckbill 60. Because this length does not change, maintaining a predetermined tension on the wrapping material 64 can be achieved easily by the above described means.

The duckbill 60 and the first intermediate arm 65 and the second intermediate arm 68 are preferably so designed that the duckbill 60 is self supporting in the retracted position (as is shown in FIG. 4). Thereby being self supported is in this context defined as in almost no need for an external force to be applied for remaining in its "home" position. As can be seen in FIG. 4, the second, third, and fourth hinge are substantially aligned so that the second intermediary arm extends substantially parallel to the duckbill 60 in cross section. Furthermore, the first intermediary arm 65 is in a position where it applies a force to the second hinge 67 in the direction of the third and fourth hinge. Thereby, the assembly remains in the retracted position without the need for an external force to be applied. A skilled person will understand that the self supporting position can be further improved by adding elements that function as an abutment for the duckbill 60 and/or the first or second intermediary arm. In the example of FIGS. 3 and 4, only one actuator needs to be provided to act on the second intermediary arm 68 for moving the duckbill 60 from the retracted to the advanced position and vice versa.

At least the hinges of which the access coincide with the guiding rolls, are located outside the turning circle of a bale in the baling chamber. Furthermore, these hinges are positioned so that their access are positioned at a distance from bale contacting elements of the baler. In this regard, reference is made to FIGS. 1 and 2 where the access of the net wrap delivery system 50 intersects with bale contacting roll 10. Such intersection makes it impossible for a guiding roll to coincide with the hinge access, namely there is no space for mounting the guiding roll. Therefore according to the invention, at least part of the hinges that coincide with the guiding rolls are positioned at a distance from a fully formed bale in the baling chamber. Although this is not shown in the figures, such configuration is theoretically possible with the duckbill that is only mounted via one hinge to the baling chamber side walls.

It will be obvious to those skilled in the art that various changes may be made without departing from the scope of the invention as defined by the claims.

The invention claimed is:

1. An agricultural round baler comprising:
   a main frame;
   a baling chamber supported by said main frame, said baling chamber having a pair of opposing sidewalls, and a pair of stationary, adjacent rolls which are rotationally affixed to said sidewalls and a pick up for feeding crop material into said baling chamber for forming therein a cylindrical bale having a cylindrical portion and a pair of opposing ends; and
   a bale wrapping mechanism comprising a roll holding station provided for holding a roll of wrapping material, the mechanism further comprising a duckbill provided for clamping one end of the roll of wrapping material, said duckbill being pivotally mounted, via at least a first hinge having an axis, to the baling chamber sidewalls, for delivering said wrapping material to said baling chamber by insertion of said duckbill between said adjacent rolls of said baling chamber, wherein the wrapping mechanism further comprises at least a first guiding roll having an axis for guiding the wrapping material between said roll holding station and said duckbill, said first guiding roll axis substantially coincides with the first hinge axis and said first hinge connects said baling chamber sidewalls with an intermediary arm that is connected to said duckbill so that said duckbill is pivotally mounted to the baling chamber sidewalls via said intermediary arm and wherein the duckbill is pivotally connected to said intermediary arm via a second hinge having an axis, whereby the wrapping mechanism comprises a second guiding roll having an axis, whereby said second guiding roll axis substantially coincides with the second hinge axis and wherein a second intermediary arm is pivotally mounted to said duckbill via a third hinge positioned at a distance from said second hinge, wherein the second intermediary arm is further pivotally mounted to said baling chamber sidewalls via a fourth hinge so that movement of the duckbill is determined by the first and second intermediary arm;

wherein pivoting said duckbill does not significantly alter the wrapping material distance between the duckbill and the roll holding station.

2. The agricultural round baler according to claim 1, wherein said duckbill comprises a pair of elongate plates that are biased towards one another to grip said wrapping material therebetween, the plates thereby forming a duckbill body showing a sharp edge at one end thereof.

3. The agricultural round baler according to claim 1, wherein said first intermediary arm is connected to said duckbill at an edge opposite to said sharp edge, while said second intermediary arm is connected to the duckbill at a central zone thereof between said edge and said sharp edge.

4. The agricultural round baler according to claim 1, wherein the duckbill is movable between an advanced position and a retracted position, whereby the duckbill sharp edge extends between the adjacent rolls to deliver the wrapping material into the baling chamber in the advanced position.

5. The agricultural round baler according to claim 4, wherein the duckbill, in the retracted position, is lower than in the extended position so that the duckbill remains in the retracted position without external forces being applied.

6. The agricultural round baler according to claim 1, wherein the guiding rolls extend substantially parallel to the roll of wrapping material.

7. The agricultural round baler according to claim 1, wherein the first hinge is located so that its axis lies at a distance from a fully formed bale in the baling chamber.

8. The agricultural round baler according to claim 1, wherein the bale wrapping mechanism further comprises a cutting mechanism with a knife for cutting the wrapping material after a bale has been wrapped.

9. The agricultural round baler according to claim 1, wherein the bale wrapping mechanism further comprises brake mechanisms provided for braking a supply roll in the roll holding station so that a tension is applied to the wrapping material.

10. A bale wrapping mechanism for an agricultural round baler, the wrapping mechanism comprising:

a roll holding station provided for holding a roll of wrapping material, a duckbill provided for clamping one end of the roll of wrapping material, said duckbill adapted for pivotal mounting, via at least a first hinge, to sidewalls of the baler, for delivering said wrapping material to said baling chamber by insertion of said duckbill between adjacent rolls of said baler, at least a first guiding roll having an axis for guiding the wrapping material between a roll holding station of the baler and said duckbill, and said first guiding roll axis substantially coincides with the first hinge axis and said first hinge connects said baling chamber sidewalls with an intermediary arm that is connected to said duckbill so that said duckbill is pivotally mounted to the baling chamber sidewalls via said intermediary arm and wherein the duckbill is pivotally connected to said intermediary arm via a second hinge having an axis, whereby the wrapping mechanism comprises a second guiding roll having an axis, whereby said second guiding roll axis substantially coincides with the second hinge axis and wherein a second intermediary arm is pivotally mounted to said duckbill via a third hinge positioned at a distance from said second hinge, wherein the second intermediary arm is further pivotally mounted to said baling chamber sidewalls via a fourth hinge so that movement of the duckbill is determined by the first and second intermediary arm;

wherein pivoting said duckbill does not significantly alter the wrapping material distance between the duckbill and the roll holding station.

* * * * *